(12) United States Patent
Kohli et al.

(10) Patent No.: US 11,636,688 B1
(45) Date of Patent: Apr. 25, 2023

(54) ENHANCED VEHICLE OPERATION

(71) Applicant: Ford Global Technologies, LLC, Dearborn, MI (US)

(72) Inventors: Naman Kohli, San Jose, CA (US); Vidhya Iyer, Sunnyvale, CA (US); Sonal Doomra, Santa Clara, CA (US); Anuja Anil Shirsat, Mountain View, CA (US); Shounak Athavale, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 17/495,118

(22) Filed: Oct. 6, 2021

(51) Int. Cl.
| | | |
|---|---|---|
| *G06V 20/56* | (2022.01) | |
| *G06K 9/62* | (2022.01) | |
| *G06V 10/60* | (2022.01) | |
| *G06V 10/98* | (2022.01) | |
| *B60W 30/09* | (2012.01) | |

(52) U.S. Cl.
CPC .......... *G06V 20/56* (2022.01); *G06K 9/6261* (2013.01); *G06V 10/60* (2022.01); *G06V 10/993* (2022.01); *B60W 30/09* (2013.01); *B60W 2420/42* (2013.01); *B60W 2555/20* (2020.02)

(58) Field of Classification Search
CPC .......... G06V 20/56–588; G06V 10/60; G06V 10/993; B60W 2420/403; B60W 2420/42; B60W 30/09; B60W 2555/20; G06K 9/6261
See application file for complete search history.

(56) References Cited

U.S. PATENT DOCUMENTS

| | | |
|---|---|---|
| 6,549,660 B1 | 4/2003 | Lipson et al. |
| 10,048,696 B2 | 8/2018 | Meyhofer et al. |
| 10,356,122 B2 | 7/2019 | Ruvio et al. |
| 10,955,841 B2 | 3/2021 | Soryal et al. |

(Continued)

FOREIGN PATENT DOCUMENTS

| | | |
|---|---|---|
| KR | 101958554 B1 | 3/2019 |
| KR | 102088956 B1 | 3/2020 |

OTHER PUBLICATIONS

Dede, G., et al. "Cybersecurity Challenges in the Uptake of Artificial Intelligence in Autonomous Driving," ENISA, European Union Agency for Cybersecurity, Feb. 11, 2021, 58 pages.

*Primary Examiner* — Casey L Kretzer
(74) *Attorney, Agent, or Firm* — Frank A. MacKenzie; Bejin Bieneman PLC

(57) ABSTRACT

A first image is obtained prior to a second image. Upon dividing the second image into a plurality of zones, light characteristic values for each of the plurality of zones are determined based on at least one of a brightness value, a contrast value, and an intensity value for the respective zones. A first difference score for one of the zones is determined based on a difference between corresponding light characteristic values for the one zone in the first and second images. Upon identifying an object in the one zone of the first and second images, a second difference score for the one zone is determined based on determining a difference between respective confidence scores associated with the corresponding identified objects. Upon determining at least one of the first or second difference score is greater than a respective threshold, the vehicle is operated based on the first image.

20 Claims, 6 Drawing Sheets

(56) References Cited

U.S. PATENT DOCUMENTS

| | | | |
|---|---|---|---|
| 2010/0121577 A1* | 5/2010 | Zhang | G06V 20/58 382/104 |
| 2016/0094801 A1* | 3/2016 | Beysserie | H04N 5/915 386/226 |
| 2019/0042738 A1 | 2/2019 | Juliato et al. | |
| 2020/0094847 A1 | 3/2020 | Goldman | |
| 2021/0112094 A1 | 4/2021 | Liu et al. | |

* cited by examiner

ENHANCED VEHICLE OPERATION

BACKGROUND

Vehicles can be equipped with computing devices, networks, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway. Vehicles may use computing devices configured to identify objects from image data collected by the vehicle sensors.

DETAILED DESCRIPTION

Figure 1:
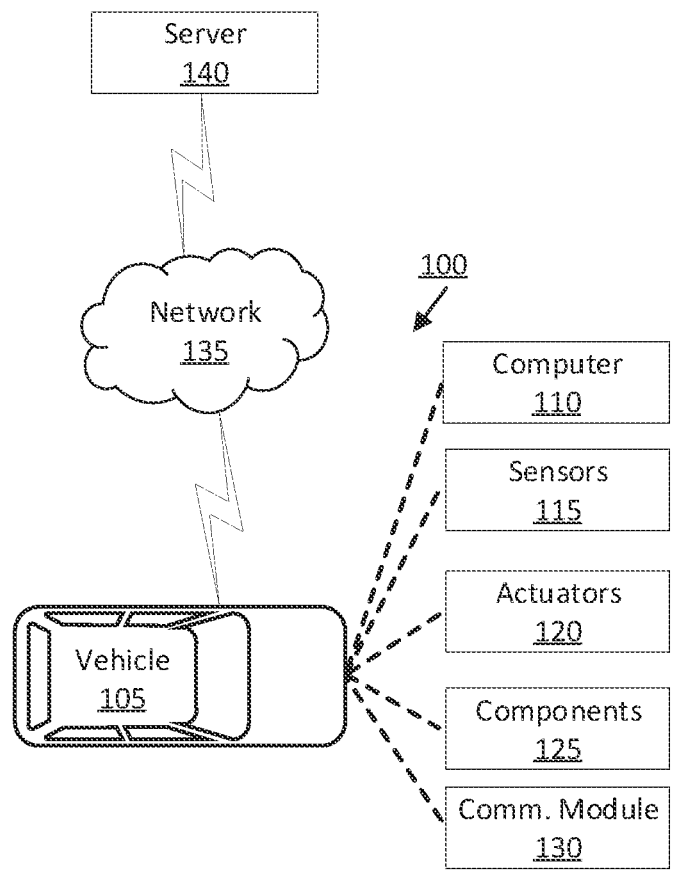
FIG. 1 is a block diagram of an example control system for a vehicle.

The presently disclosed solution provides improved object detection technology, e.g., to support improved operation of vehicles that operate according to object detection. A vehicle computer may receive data from various sensors that can be interpreted to identify or detect various objects. Misidentification of objects can occur when sensor data is incomplete or inaccurate, including when incorrect light data, perhaps injected by or at a source of the light data, appears unexpectedly in image data. Incorrect light data can affect object detection by causing a vehicle computer to misidentify an object, e.g., when the light data causes the object to appear to be something it is not, or to fail to detect the object, e.g., when the light data obscures the object in the image data.

More accurately identifying objects improves operation of the vehicle by reducing inaccurate object identification that could result in inaccurate vehicle operation. In one example, upon obtaining two images, a vehicle computer can divide the images into a plurality of zones and can then compare light characteristic values (as discussed below) of corresponding zones. Comparing the light characteristic values of the corresponding zones allows the vehicle computer to identify incorrect light data included in one or more zones of one of the images. In another example, the vehicle computer can identify objects in corresponding zones of the images. The vehicle computer can identify incorrect light data based on a difference between confidence scores associated with the respective objects identified in the corresponding zones of the images. That is, the light characteristic values or the confidence scores can be implemented to distinguish image data that should not be trusted from image data that can be trusted by identifying a presence or absence of incorrect light data in the image data. Techniques disclosed herein for processing images collected by vehicle sensors can therefore reduce incorrect or inaccurate object identification, which can prevent inaccurate vehicle operation.

A system includes a computer including a processor and a memory, the memory storing instructions executable by the processor to obtain a first image and a second image. The first image is obtained prior to the second image. The instructions further include instructions to, upon dividing the second image into a plurality of zones, determine respective light characteristic values for the plurality of zones based on at least one of a brightness value, a contrast value, and an intensity value for the respective zones. The instructions further include instructions to determine a first difference score for one of the zones based on a difference between the light characteristic value for the one zone of the second image and a light characteristic value for a corresponding zone of the first image. The instructions further include instructions to, upon identifying an object in the one zone of the first image and identifying the object in the corresponding zone of the second image, determine a second difference score for the one zone based on determining a difference between respective confidence scores associated with the corresponding identified objects. The instructions further include instructions to, upon determining at least one of the first difference score is greater than a first threshold or the second difference score is greater than a second threshold, operate a vehicle based on the first image.

The instructions can further include instructions to, upon identifying another object in the one zone of the second image and identifying the object in the corresponding zone of the first image, determine the second difference score for the one zone based on comparing a confidence score associated with the identified object in the first image to a threshold confidence score.

The instructions can further include instructions to determine the second difference score is zero based on determining the confidence score associated with the identified object in the first image is less than or equal to the threshold confidence score.

The instructions can further include instructions to predict the one zone of the second image will include an exterior light based on determining, via the first image, the identified object includes the exterior light. The instructions can further include instructions to, upon determining the first difference score for the one zone is greater than the first threshold, one of update or maintain the determined first difference score based on environment data.

The instructions can further include instructions to, upon determining the first difference score for the one zone is less than the first threshold, one of update or maintain a first difference score for another zone of the first image based on environment data and a distance between the other zone and the one zone.

The instructions can further include instructions to predict another zone of the second image will include an exterior light based on determining, via the first image, the identified object includes the exterior light. The instructions can further include instructions to, upon determining the first difference score for the one zone is greater than the first threshold, one of update or maintain the determined first difference score for the one zone based on a distance between the one zone and the other zone.

The instructions can further include instructions to maintain the first difference score for the one zone based on a) determining a first difference score for the other zone is greater than the first threshold, or b) the distance being greater than a distance threshold.

The instructions can further include instructions to, upon determining the first difference score for the other zone is greater than the first threshold, one of update or maintain the determined first difference score for the other zone based on environment data.

The instructions can further include instructions to update the first difference score for the one zone based on a) determining a first difference score for the other zone is less than the first threshold, and b) the distance being less than a distance threshold.

The instructions can further include instructions to one of update or maintain the first difference score for the one zone based additionally on environment data.

The instructions can further include instructions to, upon determining at least one of the first difference score is greater than the first threshold or the second difference score is greater than the second threshold, operate the vehicle based additionally on at least one of non-image sensor data or map data.

The instructions can further include instructions to, upon determining, for the plurality of zones of the second image, the respective first difference scores are less than or equal to the first threshold and the respective second differences score are less than or equal to the second threshold, operate the vehicle based on the second image.

A method includes obtaining a first image and a second image. The first image is obtained prior to the second image. The method further includes, upon dividing the second image into a plurality of zones, determining respective light characteristic values for the plurality of zones based on at least one of a brightness value, a contrast value, and an intensity value for the respective zones. The method further includes determining a first difference score for one of the zones based on a difference between the light characteristic value for the one zone in the first image and a light characteristic value for a corresponding zone of the first image. The method further includes, upon identifying an object in the one zone of the first image and identifying the object in the corresponding zone of the second image, determining a second difference score for the one zone based on determining a difference between respective confidence scores associated with the corresponding identified objects. The method further includes, upon determining at least one of the first difference score is greater than a first threshold or the second difference score is greater than a second threshold, operating a vehicle based on the first image.

The method can further include, upon identifying another object in the one zone of the second image and identifying the object in the corresponding zone of the first image, determining the second difference score for the one zone based on comparing a confidence score associated with the identified object in the first image to a threshold confidence score.

The method can further include predicting the one zone of the second image will include an exterior light based on determining, via the first image, the identified object includes the exterior light. The method can further include, upon determining the first difference score for the one zone is greater than the first threshold, one of updating or maintaining the determined first difference score based on environment data.

The method can further include predicting another zone of the second image will include an exterior light based on determining, via the first image, the identified object includes the exterior light. The method can further include, upon determining the first difference score for the one zone is greater than the first threshold, one of updating or maintaining the determined first difference score based on a distance between the one zone and the other zone.

The method can further include maintaining the first difference score for the one zone based on a) determining a first difference score for the other zone is greater than the first threshold, or b) the distance being greater than a distance threshold.

The method can further include, upon determining the first difference score for the other zone is greater than the first threshold, one of updating or maintaining the determined first difference score for the other zone based on environment data.

The method can further include updating the first difference score for the one zone based on a) determining a first difference score for the other zone is less than the first threshold, and b) the distance being less than a distance threshold.

The method can further include one of updating or maintaining the first difference score for the one zone based additionally on environment data.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-4C, an example control system 100 includes a vehicle 105. A vehicle computer 110 in the vehicle 105 can receive data from sensors 115, including a first image 300 and a second image 305. The first image 300 is obtained prior to the second image 305. The vehicle computer 110 is programmed to, upon dividing the second image 305 into a plurality of zones $Z_{rc}$, determine respective light characteristic values L for the plurality of zones $Z_{rc}$ based on at least one of a brightness value B, a contrast value C, and an intensity value I for the respective zone $Z_{rc}$. The vehicle computer 110 is further programmed to determine a first difference score for one of the zones $Z_{rc}$ based on a difference between the light characteristic value L for the one zone $Z_{rc}$ of the second image 305 and a light characteristic value L for a corresponding zone $Z_{rc}$ of the first image 300. The vehicle computer 110 is further programmed to, upon identifying an object 310 in the one zone $Z_{rc}$ of the first image 300 and identifying the object 310 in the corresponding zone $Z_{rc}$ of the second image 305, determine a second difference score for the one zone $Z_{rc}$ based on determining a difference between respective confidence scores associated with the corresponding identified objects 310. The vehicle computer 110 is further programmed to, upon determining at least one of the first difference score is greater than a first threshold or the second difference score is greater than a second threshold, operate the vehicle 105 based on the first image 300.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with a remote server computer 140, and/or other vehicles 105, e.g., via a messaging or broadcast protocol such as Dedicated Short Range Communications (DSRC), cellular, and/or other protocol that can support vehicle-to-vehicle, vehicle-to-infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor 115 data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor 115(s), etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor 115(s), e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote server computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle 105, a sign, a tree, etc., relative to the vehicle 105. As one example, the data may be image data of an environment around the vehicle 105. In such an example, the image data may include one or more objects in the environment around the vehicle 105. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or short-range radio communications, etc.) to another vehicle, and/or to a remote server computer 140 (typically via direct radio frequency communications). The communications module 130 could include one or more mechanisms, such as a transceiver, by which the computers of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. For convenience, the label "V2X" is used herein for communications that may be vehicle-to-vehicle (V2V) and/or vehicle-to-infrastructure (V2I), and that may be provided by communication module 130 according to any suitable short-range communications mechanism, e.g., DSRC, cellular, or the like.

The network 135 represents one or more mechanisms by which a vehicle computer 110 may communicate with remote computing devices, e.g., the remote server computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device, i.e., including one or more processors and one or more memories, programmed to provide operations such as disclosed herein. Further, the remote server computer 140 can be accessed via the network 135, e.g., the Internet, a cellular network, and/or or some other wide area network.

Figure 2:
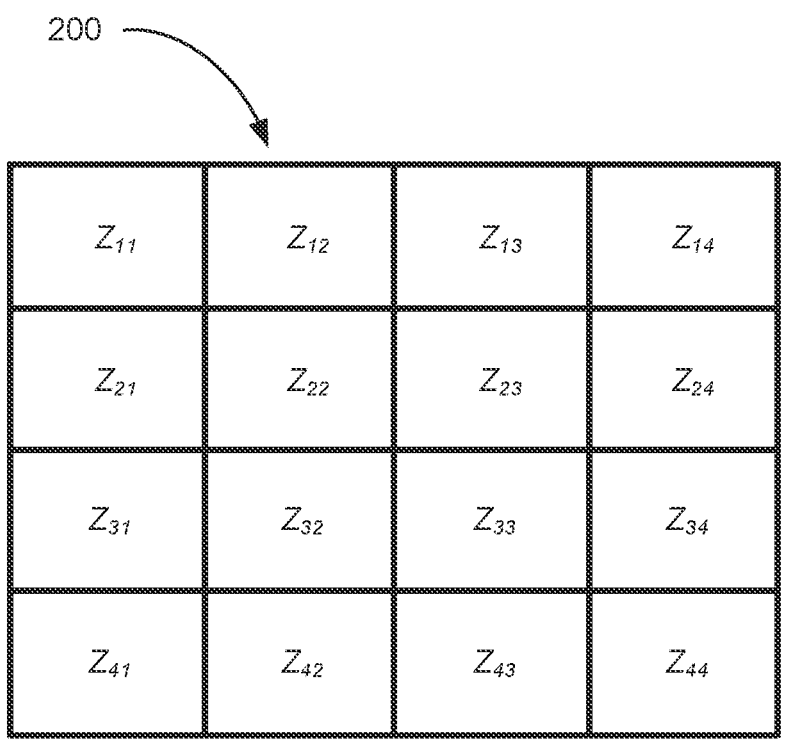
FIG. 2 is a diagram of example image zones.
Figure 3:
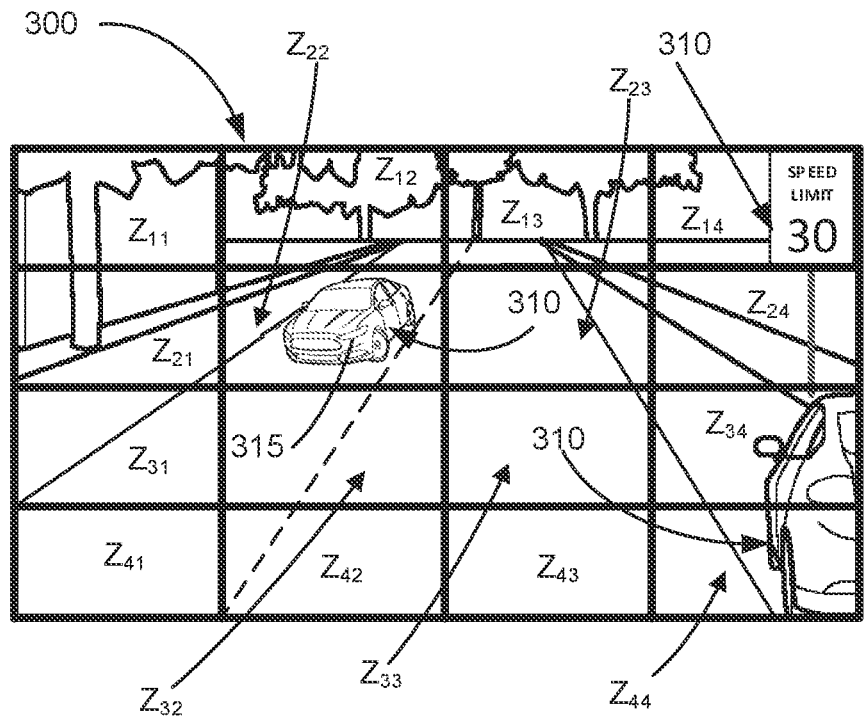
FIG. 3 is an example first image divided into exemplary zones.
Figure 4A:
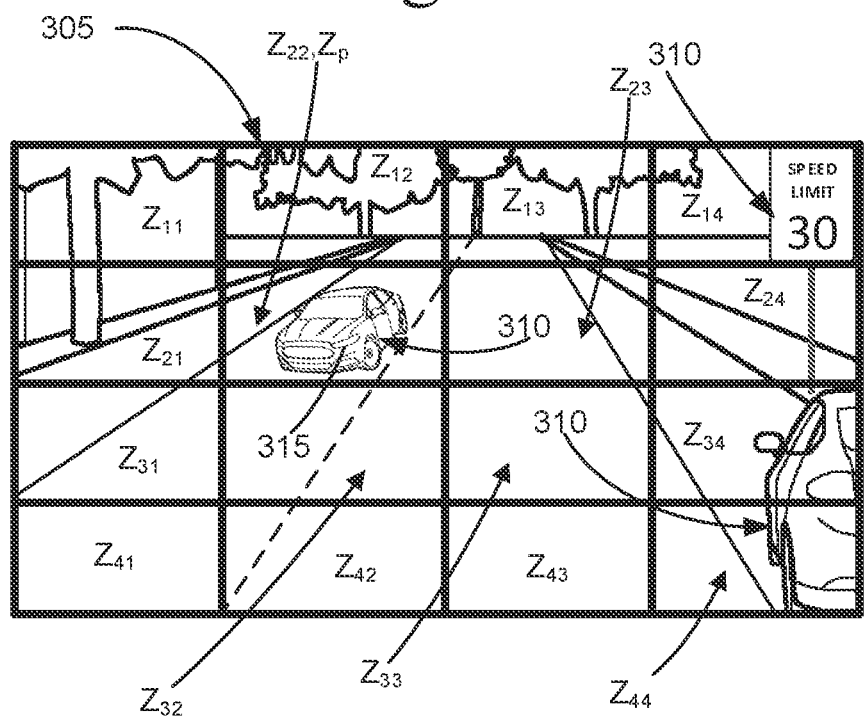
FIGS. 4A-4C are example second images divided into exemplary zones.
Figure 4B:
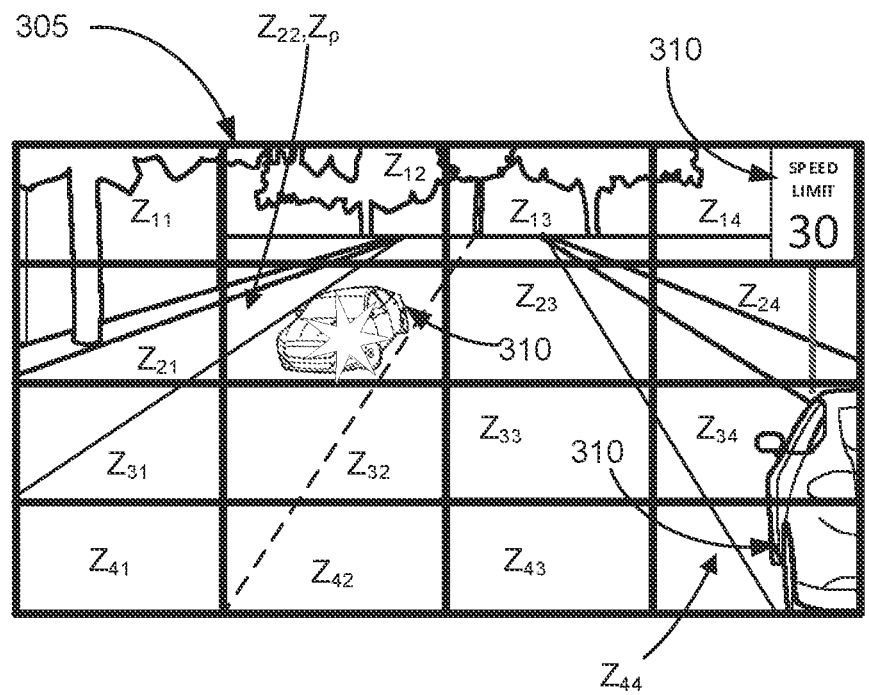
Figure 4C:
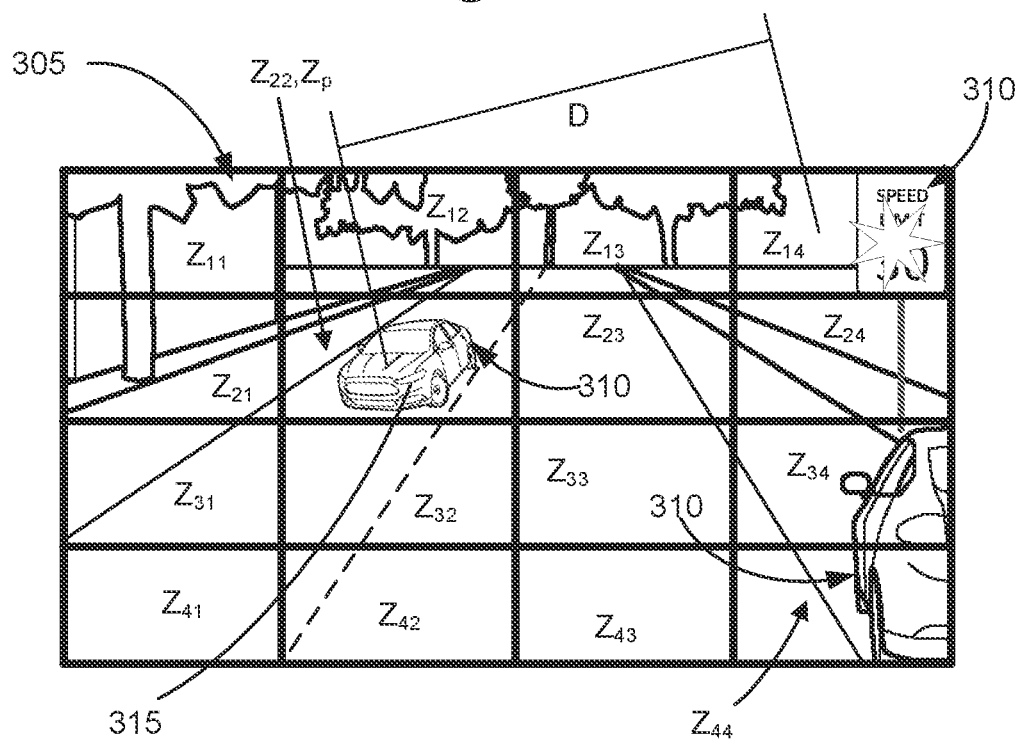

FIG. 2 is a diagram of an example image 200 divided into zones $Z_{rc}$ where r denotes the row and c denotes the column in which a zone $Z_{rc}$ occupies. Techniques disclosed herein can detect incorrect light data, i.e., light data that that fails to accurately represent lighting conditions, in an image 200 by using image processing techniques and object detection techniques to detect variations between corresponding zones $Z_{rc}$ of respective images.

The vehicle computer 110 can receive image data of the environment around the vehicle 105. For example, the vehicle computer 110 can actuate a sensor 115 to obtain a first image 300 of the environment (see FIG. 3) and a second image 305 of the environment (see FIG. 4A). A second image 305 in this context, i.e., where a sensor 115 has obtained first and second images 300, 305, is an image obtained subsequent to the first image 300. The first and second images 300, 305 can, for example, be temporally successive images. As another example, the vehicle computer 110 can obtain one or more intermediate images between the first and second images 300, 305.

Upon obtaining the first and second images 300, 305, the vehicle computer 110 can divide the respective images 300, 305 into the plurality of zones $Z_{rc}$, e.g., according to conventional techniques. For example, the vehicle computer 110 can overlay a grid onto the respective images 300, 305 such that the grid divides the images 300, 305 into the plurality of zones $Z_{rc}$. In such an example, the grid specifies a plurality of cells that correspond to respective zones $Z_{rc}$. Each cell is defined by a height, e.g., in a number of pixels, and a width, e.g., in a number of pixels. The cells may be symmetrical, i.e., have a uniform height and width, or the cells may be asymmetrical, i.e., at least one of the cells has a different height and/or width than the other cells. The zones $Z_{rc}$ of the second image 305 correspond to the zones $Z_{rc}$ of the first image 300.

The images 300, 305 can include one or more objects 310 around the vehicle 105. The vehicle computer 110 can, for example, detect an object 310 and/or physical features of the object 310, e.g., a wheel, an exterior light 315, a handle, a window, a door, etc., included in the images 300, 305, e.g., according to conventional object detection techniques. The vehicle computer 110 can determine one or more zones $Z_{rc}$ within which the detected object 310 is included in the respective image 300, 305. For example, the vehicle computer 110 can determine the detected object 310 is in one zone $Z_{rc}$ when the detected object 310 is included entirely within boundaries of the one zone $Z_{rc}$. Alternatively, the vehicle computer 110 can determine the detected object 310 is in a plurality of zones $Z_{rc}$ when the detected object 310 extends across boundaries of one zone $Z_{rc}$ into another zone $Z_{rc}$. In such an example, the vehicle computer 110 can determine some physical features of the detected object 310 are in one zone $Z_{rc}$ and other physical features of the detected object 310 are in another zone $Z_{rc}$.

Additionally, the vehicle computer 110 can be programmed to classify and/or identify types of objects 310 based on the respective image 300, 305. For example, suitable object 310 classification or identification techniques, e.g., such as mentioned below, can be used, e.g., in the vehicle computer 110 based on sensor 115 data, to classify and/or identify a type of object 310, as well as physical features of objects 310. Non-limiting examples of types of objects 310 include another vehicle, a pedestrian, a building, a pole, etc.

Various techniques may be used to interpret image data and/or to classify objects 310 based on image data. For example, the respective images 300, 305 can be provided to a classifier that comprises programming to utilize one or more conventional image classification techniques. For example, the classifier can use a machine learning technique in which data known to represent various objects 310, is provided to a machine learning program for training the classifier. Once trained, the classifier can accept as input vehicle 105 sensor 115 data, e.g., an image, and then provide as output, for each of one or more respective regions of interest in the image, an identification and/or a classification of one or more types of objects 310 or an indication that no object 310 is present in the respective region of interest. Further, a coordinate system (e.g., polar or cartesian) applied to an area proximate to the vehicle 105 can be used to specify locations and/or areas (e.g., according to the vehicle 105 coordinate system, translated to global latitude and longitude geo-coordinates, etc.) of objects 310 identified from image data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

Upon identifying the type of object 310, the vehicle computer 110 determines a confidence score associated with the identified object 310. As used herein, a "confidence score" is a number, typically a scalar value, e.g., between 0 and 1, inclusive, that indicates a likelihood of the detected object 310 being the identified object 310. The vehicle computer 110 can determine the confidence score, e.g., according to known object classification and/or identification techniques. For example, the classifier may be further trained to output a confidence score in addition to the identification and/or the classification of one or more types of objects 310 or an indication that no object 310 is present in the respective region of interest. That is, once trained, the classifier can accept as input the respective image 300, 305, and then provide as output a confidence score for the identified object 310 in the respective image 300, 305. The vehicle computer 110 can store, e.g., in the memory of the vehicle computer 110, the confidence score associated with the identified object 310 in the zone(s) $Z_{rc}$ of the respective images 300, 305.

Upon determining, via the first image 300, that an identified object 310 includes an exterior light 315, e.g., a headlamp on a vehicle 105, the vehicle computer 110 can predict a zone 4 of the second image 305 that will include the exterior light 315 based on a future location of the object 310. Upon predicting the future location for the object 310, the vehicle computer 110 can, for example, overlay a representation of the object 310 at the predicted future location to the first image 300. The vehicle computer 110 can then compare the representation to the plurality of zones $Z_{rc}$ to predict the zone 4 in which the object 310, and specifically the exterior light 315, will be included in the second image 305. The predicted zone 4 can be a same or difference zone $Z_{rc}$ as the current zone $Z_{rc}$ in which the identified object 310 is included in the first image 300. The vehicle computer 110 can store, e.g., in the memory of the vehicle computer 110, the predicted zone $Z_p$.

In an example in which the object 310 is stationary, e.g., a light pole, the vehicle computer 110 can predict the future location of the object 310 based on the object's 310 current location. In an example in which the object 310 is mobile, e.g., a vehicle 105, the vehicle computer 110 can predict the future location of the object 310 based on sensor 115 data. The future location of the mobile object 310 may be defined at least in part by a predicted path of the mobile object 310. For example, the vehicle computer 110 can predict a path of the mobile object 310 based on identifying a direction of movement of the mobile object 310 via sensor 115 data, e.g., sequential frames of image data. As another example, the vehicle computer 110 can receive a path of the mobile object 310 from the mobile object 310, e.g., via the network 135, V2V communication, etc.

The vehicle computer 110 can determine respective light characteristic values L for the plurality of zones $Z_{rc}$ in the respective images 300, 305. As used herein, a "light characteristic value" is a measure that the vehicle computer 110 can use to detect incorrect light data within a zone $Z_{rc}$. The light characteristic value L is a numerical value, e.g., an integer. The light characteristic value L is an $L^2$, i.e., Euclidean, norm of a vector defined by an intensity value I for the zone $Z_{rc}$, a brightness value B for the zone $Z_{rc}$, and a contrast value C for the zone $Z_{rc}$. The light characteristic value L can be calculated by the equation:

$$L=\sqrt{(I^2+B^2+C^2)} \quad (1)$$

As used herein, an "intensity value" is a numerical value, e.g., an integer, that indicates an average pixel intensity value for the zone $Z_{rc}$. To determine the intensity value I, the vehicle computer 110 can determine respective pixel intensity values for a plurality of pixels within the zone $Z_{rc}$, e.g., according to known image processing techniques. The vehicle computer 110 can then sum the pixel intensity values and divide by the number of pixels within the zone $Z_{rc}$ to determine the intensity value I for the zone $Z_{rc}$. The vehicle computer 110 can determine the number of pixels within the zone $Z_{rc}$ based on the height and width of the zone $Z_{rc}$.

As used herein, a "brightness value" is a numerical value, e.g., an integer, that is determined as a difference between the intensity value I for the zone $Z_{rc}$ and an average of the intensity values I of adjacent zones $Z_{r\pm1c}, Z_{rc\pm1}, Z_{r\pm1c\pm1}$, i.e., an average intensity value $I_{avg}$ for the zones $Z_{r\pm1c}, Z_{rc\pm1}, Z_{r\pm1c\pm1}$ that border the zone $Z_{rc}$. The vehicle computer 110 can determine the respective intensity values I for the adjacent zones $Z_{r\pm1c}, Z_{rc\pm1}, Z_{r\pm1c\pm1}$, e.g., in substantially the same manner as just discussed. The vehicle computer 110 can then determine the average intensity value $I_{avg}$ for the adjacent zones $Z_{r\pm1c}, Z_{rc\pm1}, Z_{r\pm1c\pm1}$ by averaging the respective intensity values I for the adjacent zones $Z_{r\pm1c}, Z_{rc\pm1}, Z_{r\pm1c\pm1}$, i.e., summing the intensity values I for the adjacent zones $Z_{r\pm1c}, Z_{rc\pm1}, Z_{r\pm1c\pm1}$ and dividing by the number of adjacent zones $Z_{r\pm1c}, Z_{rc\pm1}, Z_{r\pm1c\pm1}$. The vehicle computer 110 can then subtract the intensity value I for the zone $Z_{rc}$ from the average intensity value $I_{avg}$ for the adjacent zones $Z_{r\pm1c}, Z_{rc\pm1}, Z_{r\pm1c\pm1}$. The vehicle computer 110 can determine the difference is the brightness value B for the zone $Z_{rc}$.

As used herein, a "contrast value" is a numerical value, e.g., an integer, that indicates a difference between the maximum pixel intensity value within the zone $Z_{rc}$ and a minimum pixel intensity value within the zone $Z_{rc}$. Upon determining respective pixel intensity values for the pixels within the zone $Z_{rc}$, e.g., according to known image processing techniques, the vehicle computer 110 can, for example, compare the plurality of pixel intensity values and select the maximum and minimum pixel intensity values. The vehicle computer 110 can then subtract the minimum pixel intensity value from the maximum pixel intensity value to determine the contrast value C for the zone $Z_{rc}$.

Upon determining the respective light characteristic values L for the plurality of zones $Z_{rc}$ in the respective images 300, 305, the vehicle computer 110 can determine respective first difference scores for the plurality of zones $Z_{rc}$. A first difference score, as that term is used herein, is a numerical value, e.g., an integer, that represents a likelihood that the zone $Z_{rc}$ includes incorrect light data. To determine the first difference score for a zone $Z_{rc}$, the vehicle computer 110 subtracts the light characteristic value L for the zone $Z_{rc}$ of the second image 305 from the light characteristic value L for the corresponding zone $Z_{rc}$ of the first image 300. The vehicle computer 110 continues to determine first difference scores in this manner until the vehicle computer 110 determines respective first difference scores for the plurality of zones $Z_{rc}$.

The vehicle computer 110 can compare the respective first difference scores for the plurality of zones $Z_{rc}$ to the first threshold. The first threshold can be determined empirically, e.g., based on testing that allows for determining a maximum difference between light characteristic values L for images above which a vehicle computer 110 can determine a presence of incorrect light data. Upon determining the respective first differences scores are less than or equal to the first threshold, the vehicle computer 110 can operate the vehicle 105 based on the second image 305. That is, the vehicle computer 110 can use the second image 305 to determine a path (as described below), e.g., that avoids objects 310 identified in the second image 305. The vehicle computer 110 can then actuate one or more vehicle components 125 to move the vehicle 105 along the path.

Upon determining at least one first difference score is greater than the first threshold, the vehicle computer 110 identifies the zone(s) $Z_{rc}$ associated with the at least one first difference score. The vehicle computer 110 can then determine to one of update or maintain the at least one first difference score based on environment data and the predicted zone $Z_p$. Upon determining to update the at least one first difference score, the vehicle computer 110 sets the at least one first difference score to a predetermined value that is less than the first threshold, e.g., zero. In this situation, the vehicle computer 110 can operate the vehicle 105 based on the second image 305, as just discussed.

Environment data is data providing measurements of physical features or phenomena outside a vehicle 105, i.e., in an environment around the vehicle 105, that is collected about operation of one or more vehicle 105 subsystems and/or components 125; environment data includes road data, weather data, traffic density data, vehicle 105 performance data, and a time of day. Environment data is typically collected by vehicle 105 sensors 115, but alternatively or additionally could be provided from a source outside the vehicle 105, e.g., a remote server computer 140, based on time or times that the vehicle 105 is at or traveling through a specified location.

In an example in which the identified zone $Z_{rc}$ is the predicted zone 4 (see FIG. 4B), i.e., the first difference score for the predicted zone 4 is greater than the first threshold, the vehicle computer 110 can, for example, determine to update the first difference score for the identified zone $Z_{rc}$ when the environment data indicates conditions in which exterior lights 315 are expected to be turned on, e.g., at night, during overcast conditions, in a presence of precipitation, etc. In this situation, the vehicle computer 110 can determine that the exterior light 315 is included in the predicted zone 4 of the second image 305 and is turned on. That is, the vehicle computer 110 can determine that the first difference score for the predicted zone 4 is caused by the exterior light 315.

As another example, the vehicle computer 110 can determine to maintain the first difference score for the identified zone $Z_{rc}$ when the environment data indicates conditions in which exterior lights 315 are expected to be turned off, e.g., during the day, in an absence of precipitation, during sunny conditions, etc. In this situation, the vehicle computer 110 can determine that the first difference score for the predicted zone 4 is not caused by the exterior light 315. The vehicle computer 110 can determine to maintain the respective first difference scores for other zones $Z_{rc}$ based on the predicted zone 4 being the identified zone $Z_{rc}$.

In an example in which the identified zone $Z_{rc}$ is a zone $Z_{rc}$ other than the predicted zone 4 (see FIG. 4C), i.e., the first difference score for the predicted zone 4 is less than the first threshold, the vehicle computer 110 can determine to update or maintain the first difference score for the identified zone $Z_{rc}$ based on a distance D between the identified zone $Z_{rc}$ and the predicted zone $Z_p$. The distance D is a straight line distance from a predetermined point, e.g., a center a vertex, etc., in one zone $Z_{rc}$ to a corresponding predetermined point in another zone $Z_{rc}$ of an image. For example, the vehicle computer 110 can determine coordinates of respective predetermined points relative to a pixel coordinate system having an origin at a center of the image. The vehicle computer 110 can then determine the distance D between the predetermined points using known calculation methods.

The vehicle computer 110 can, for example, compare the distance D to a distance threshold. The distance threshold specifies a maximum distance within which the vehicle computer 110 may detect the exterior light 315 in the second image 305. That is, the distance threshold may indicate a margin of error for the predicted zone $Z_p$. The distance threshold may be determined empirically, e.g., based on testing that allows for determining a prediction accuracy based on a number of instances of detecting an exterior light 315 in a zone $Z_{rc}$ relative to a number of instances of predicting the exterior light 315 will be in the zone $Z_{rc}$. The distance threshold may be stored, e.g., in a memory of the vehicle computer 110.

Upon determining that the distance D is less than or equal to the distance threshold, the vehicle computer 110 can determine to update the first difference score for the identified zone $Z_{rc}$ based on the environment data indicating conditions in which exterior lights 315 are expected to be turned on. In this situation, the vehicle computer 110 can determine that the exterior light 315 is included in the identified zone $Z_{rc}$ of the second image 305 and is turned on. That is, the vehicle computer 110 can determine that the first difference score for the identified zone $Z_{rc}$ is caused by the exterior light 315. Alternatively, the vehicle computer 110 can determine to maintain the first difference score for the identified zone $Z_{rc}$ based on the environment data indicating conditions in which exterior lights 315 are expected to be turned off. In this situation, the vehicle computer 110 can determine that the first difference score for the identified zone $Z_{rc}$ is not caused by the exterior light 315.

Upon determining that the distance D is greater than the distance threshold, the vehicle computer 110 can determine to maintain the first difference score of identified zone $Z_{rc}$, e.g., regardless of the environment data. In this situation, the vehicle computer 110 can determine that the first difference score for the identified zone $Z_{rc}$ is not caused by the exterior light 315.

Upon determining to maintain the at least one first difference score, the vehicle computer 110 can ignore the second image 305. In this situation, the vehicle computer 110 can operate the vehicle 105 based on the first image 300, e.g., in substantially the same manner as discussed above with regard to operating the vehicle 105 based on the second image 305. Additionally, or alternatively, the vehicle computer 110 can operate the vehicle 105 based on at least one of map data or non-image sensor 115 data, e.g., in substantially the same manner as discussed above with regard to operating the vehicle 105 based on the second image 305. The vehicle computer 110 can, for example, receive map data from the remote server computer 140. The vehicle computer 110 can actuate one or more non-image sensors 115, e.g., a lidar sensor 115, a radar sensor 115, an ultrasonic sensor 115, etc., to obtain the non-image sensor 115 data.

Additionally, the vehicle computer 110 can determine second difference scores for the plurality of zones $Z_{rc}$. A second difference score, as that term is used herein, is a numerical value, e.g., an integer, that represents a likelihood that the vehicle computer 110 misidentified an object 310 based on incorrect light data in a zone $Z_{rc}$. To determine the second difference score for a zone $Z_{rc}$, the vehicle computer 110 compares the confidence score associated with an identified object 310 in the zone $Z_{rc}$ of the first image 300 to a threshold confidence score. The threshold confidence score may be determined empirically, e.g., based on testing that allows for determining a minimum confidence score at which a vehicle computer 110 can accurately identify an object 310. The threshold confidence score may be stored, e.g., in a memory of the vehicle computer 110. If the confidence score associated with an identified object 310 in the zone $Z_{rc}$ of the first image 300 is less than the threshold confidence score, then the vehicle computer 110 determines that the second difference score for the zone $Z_{rc}$ is a predetermined value less than the second threshold, e.g., zero.

If the confidence score associated with an identified object 310 in the zone $Z_{rc}$ of the first image 300 is greater than or equal to the threshold, then the vehicle computer 110 compares the identified object 310 in the zone $Z_{rc}$ of the first image 300 to the identified object 310 in the corresponding zone $Z_{rc}$ of the second image 305. If the identified object 310 in the zone $Z_{rc}$ of the second image 305 is different than the identified object 310 in the corresponding zone $Z_{rc}$ of the first image 300, then the vehicle computer 110 determines that the second difference score for the zone $Z_{rc}$ is a predetermined value that is greater than the second threshold, e.g., one. If the identified object 310 in the zone $Z_{rc}$ of the second image 305 is the same as the identified object 310 in the corresponding zone $Z_{rc}$ of the first image 300, then the vehicle computer 110 determines the second difference score for the zone $Z_{rc}$ by subtracting the confidence score associated with the identified object 310 in the zone $Z_{rc}$ of the second image 305 from the confidence score associated with the identified object 310 in the corresponding zone $Z_{rc}$ of the first image 300.

The vehicle computer 110 can compare the respective second difference scores for the plurality of zones $Z_{rc}$ to the second threshold. The second threshold can be determined empirically, e.g., based on testing that allows for determining a maximum difference between confidence scores above which a vehicle computer 110 can determine misidentification of an object 310 caused by incorrect light data. If the respective second difference scores are less than or equal to the second threshold, then the vehicle computer 110 can operate the vehicle 105 based on the second image 305, as discussed above. If at least one of the second difference scores is greater than the second threshold, then the vehicle computer 110 can ignore the second image 305. In this situation, the vehicle computer 110 can operate the vehicle 105 based on the first image 300, as discussed above. Additionally, or alternatively, the vehicle computer 110 can operate the vehicle 105 based on at least one of map data or non-image sensor 115 data, as discussed above.

As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive two-dimensional locations included in the vehicle motion vector with respect to the ground surface, for example.

Further for example, the path polynomial is a model that predicts the path as a line traced by a polynomial equation. The path polynomial predicts the path for a predetermined upcoming distance, by determining a lateral coordinate, e.g., measured in meters:

$$p(x)=a_0+a_1x+a_2x^2+a_3x^3 \qquad (2)$$

where $a_0$ is an offset, i.e., a lateral distance between the path and a center line of the vehicle 105 at the upcoming distance, $a_1$ is a heading angle of the path, $a_2$ is the curvature of the path, and $a_3$ is the curvature rate of the path.

Figure 5A:
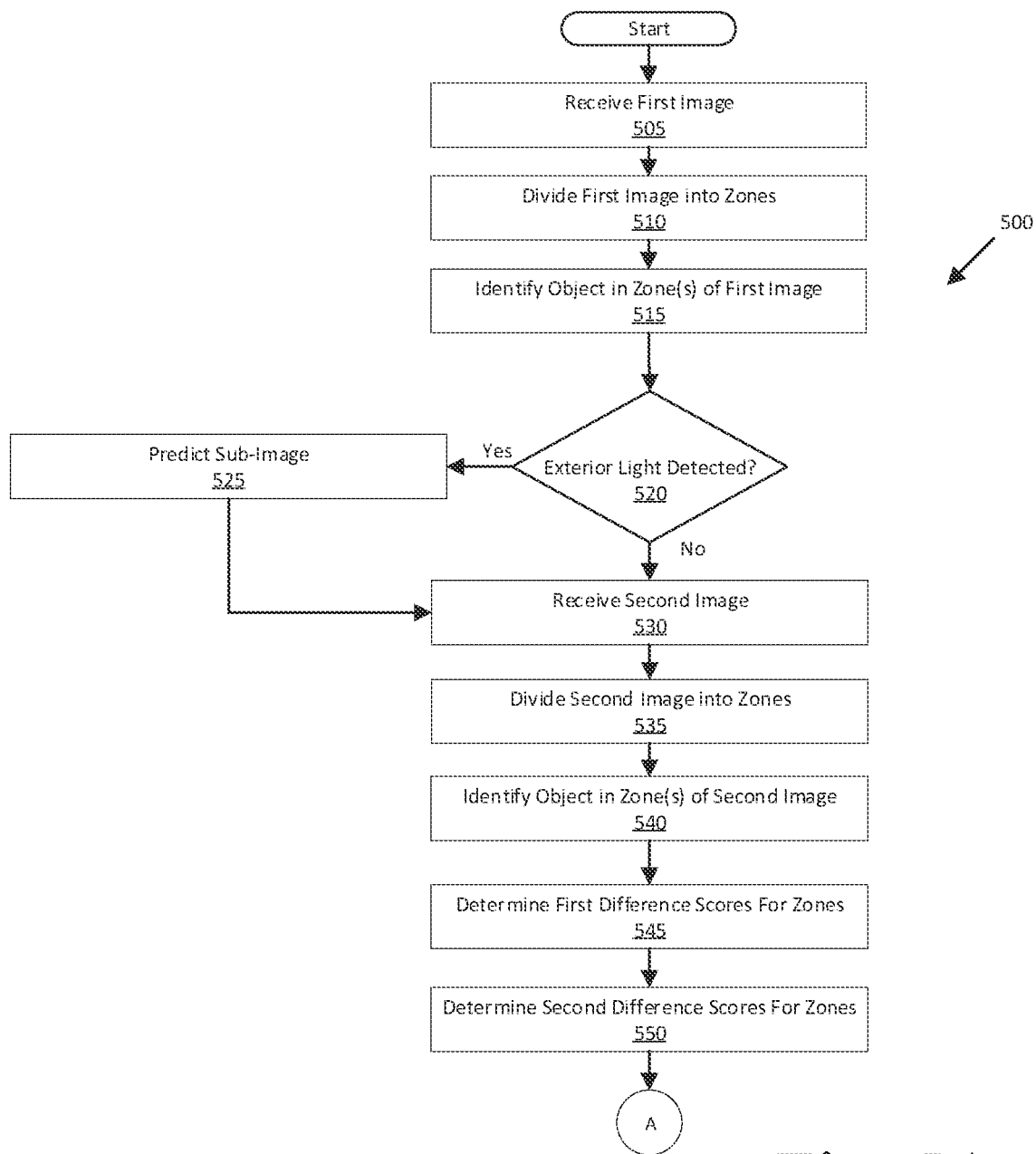
FIG. 5A is a first part of a flowchart of an example process for operating the vehicle.

FIG. 5A is a first portion of a flowchart of an example process 500 (the second portion being shown in FIG. 5B because the entire flowchart will not fit on a single drawing sheet) executed in a vehicle computer 110 in a vehicle 105 according to program instructions stored in a memory thereof for operating the vehicle 105.

The process 500 begins in a block 505. In the block 505, the vehicle computer 110 receives data from one or more sensors 115, e.g., via a vehicle 105 network 135, from a remote server computer 140, e.g., via a network 135, and/or from a computer in another vehicle 105, e.g., via V2V communications. For example, the vehicle computer 110 can receive a first image 300, e.g., from an image sensor 115. The first image 300 may include data about the environment around the vehicle 105. The process 500 continues in a block 510.

In the block 510, the vehicle computer 110 divides the first image 300 into a plurality of zones $Z_{rc}$, as discussed above. The process 500 continues in a block 515.

In the block 515, the vehicle computer 110 identifies an object 310 included in the first image 300, as discussed above. Additionally, the vehicle computer 110 can determine a confidence score for the identified object 310, as discussed above. The vehicle computer 110 can determine the identified object 310 is included in one or more zones $Z_{rc}$ of the first image 300, as discussed above. The process 500 continues in a block 520.

In the block 520, the vehicle computer 110 determines whether the identified object 310 includes an exterior light 315. For example, the vehicle computer 110 can detect the exterior light 315 in the first image 300, as discussed above. If the vehicle computer 110 detects the exterior light 315 on the object 310, then the process 500 continues in a block 525. Otherwise, the process 500 continues in a block 530.

In the block 525, the vehicle computer 110 predicts a zone 4 in a second image 305 that will include the exterior light 315 based on predicting a future location of the object 310, as discussed above. The process 500 continues in a block 530.

In the block 530, the vehicle computer 110 receives a second image 305. The block 530 is substantially the same as the block 505 of process 500 and therefore will not be described further to avoid redundancy. The process 500 continues in a block 535.

In the block 535, the vehicle computer 110 divides the second image 305 into a plurality of zones $Z_{rc}$, as discussed above. The plurality of zones $Z_{rc}$ of the second image 305 correspond to the plurality of zones $Z_{rc}$ of the first image 300. The process 500 continues in a block 540.

In the block 540, the vehicle computer 110 identifies one or more objects 310 included in the second image 305. The block 540 is substantially the same as the block 515 of process 500 and therefore will not be described further to avoid redundancy. The process 500 continues in a block 545.

In the block 545, the vehicle computer 110 determines respective first difference scores for the plurality of zones $Z_{rc}$. The vehicle computer 110 determines a first difference score from a light characteristic value L for a zone $Z_{rc}$ of the first image 300 and a light characteristic value L for a corresponding zone $Z_{rc}$ of the second image 305, as discussed above. The vehicle computer 110 determines the light characteristic value L for a zone $Z_{rc}$ of an image 300, 305, e.g., according to Equation 1, as discussed above. The process 500 continues in a block 550.

In the block 550, the vehicle computer 110 determines respective second difference scores for the plurality of zones $Z_{rc}$. To determine a second difference score for a zone $Z_{rc}$, the vehicle computer 110 compares the confidence score associated with the identified object 310 in the zone $Z_{rc}$ of the first image 300 to a threshold confidence score. If the confidence score associated with the identified object 310 in the zone $Z_{rc}$ of the first image 300 is less than the threshold confidence score, then the vehicle computer 110 determines that the second difference score is a predetermined value less than a second threshold, as discussed above.

If the confidence score associated with the identified object 310 in the zone $Z_{rc}$ of the first image 300 is greater than or equal to the threshold confidence score, then the vehicle computer 110 determines the second difference score based on comparing the identified object 310 in the zone $Z_{rc}$ of the second image 305 to the identified object 310 in the zone $Z_{rc}$ of the first image 300. If the identified object 310 in the zone $Z_{rc}$ of the second image 305 is the same as the identified object 310 in the zone $Z_{rc}$ of the first image 300, then the vehicle computer 110 determines the second difference score based on the confidence scores associated with the identified objects 310 in the corresponding zones $Z_{rc}$ of the images 300, 305, as discussed above.

If the identified object 310 in the zone $Z_{rc}$ of the second image 305 is the different than the identified object 310 in the zone $Z_{rc}$ of the first image 300, then the vehicle computer 110 determines that the second difference score is a predetermined value greater than the second threshold, as discussed above. The process 500 continues in a block 555.

Figure 5B:
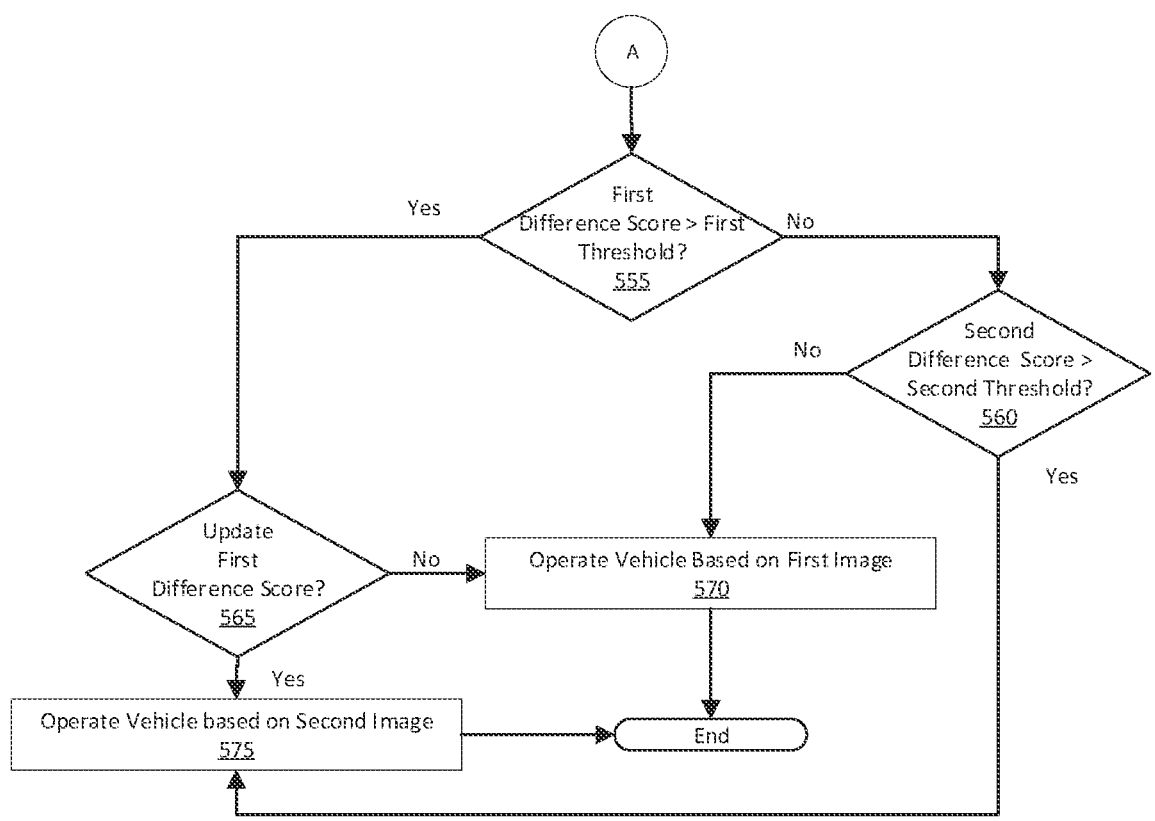
FIG. 5B is a second part of the flowchart of FIG. 5A.

Turning now to FIG. 5B, following the block 550 shown in FIG. 5A, in the block 555, the vehicle computer 110 determines whether the respective first difference scores are greater than a first threshold. That is, the vehicle computer 110 compares the respective first difference scores to the first threshold. If the respective first difference scores are less than or equal to the first threshold, then the process 500 continues in a block 560. If at least one of the first difference scores is greater than the first threshold, then the process 500 continues in a block 565.

In the block 560, the vehicle computer 110 determines whether the respective second difference scores are greater than the second threshold. That is, the vehicle computer 110 compares the respective second difference scores to the second threshold. If the respective second difference scores are less than or equal to the second threshold, then the process 500 continues in a block 575. If at least one of the second difference scores is greater than the second threshold, then the process 500 continues in a block 570.

In the block 565, the vehicle computer 110 determines whether to update or maintain the at least one first difference score that is greater than the first threshold based on the predicted zone 4 and environment data, as discussed above. Additionally, the vehicle computer 110 can determine to update or maintain the at least one first difference score based on a distance D between the predicted zone 4 and the respective zone(s) $Z_{rc}$ corresponding to the at least one first difference score, as discussed above. If the vehicle computer 110 determines to update the at least one first difference score, then the process 500 continues in the block 575. Otherwise, the process 500 continues in the block 570.

In the block 570, the vehicle computer 110 ignores the second image 305. In this situation, the vehicle computer 110 can operate the vehicle 105 based on the first image 300, as discussed above. Additionally, or alternatively, the vehicle computer 110 can operate the vehicle 105 based on at least one of non-image sensor 115 data or map data, as discussed above. The process 500 ends following the block 570.

In the block 575, the vehicle computer 110 operates the vehicle 105 based on the second image 305, as discussed above. The process 500 ends following the block 575.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor to:
   obtain a first image and a second image, wherein the first image is obtained prior to the second image;
   upon dividing the second image into a plurality of zones, determine respective light characteristic values for the plurality of zones based on at least one of a brightness value, a contrast value, and an intensity value for the respective zones;
   determine a first difference score for one of the zones based on a difference between the light characteristic value for the one zone of the second image and a light characteristic value for a corresponding zone of the first image;
   upon identifying an object in the one zone of the first image and identifying the object in the corresponding zone of the second image, determine a second difference score for the one zone based on determining a difference between respective confidence scores associated with the corresponding identified objects; and
   upon determining at least one of the first difference score is greater than a first threshold or the second difference score is greater than a second threshold, operate a vehicle based on the first image.

2. The system of claim 1, wherein the instructions further include instructions to, upon identifying another object in the one zone of the second image and identifying the object in the corresponding zone of the first image, determine the second difference score for the one zone based on comparing a confidence score associated with the identified object in the first image to a threshold confidence score.

3. The system of claim 2, wherein the instructions further include instructions to determine the second difference score is zero based on determining the confidence score associated with the identified object in the first image is less than or equal to the threshold confidence score.

4. The system of claim 1, wherein the instructions further include instructions to:
   predict the one zone of the second image will include an exterior light based on determining, via the first image, the identified object includes the exterior light; and
   upon determining the first difference score for the one zone is greater than the first threshold, one of update or maintain the determined first difference score based on environment data.

5. The system of claim 4, wherein the instructions further include instructions to, upon determining the first difference score for the one zone is less than the first threshold, one of update or maintain a first difference score for another zone of the first image based on environment data and a distance between the other zone and the one zone.

6. The system of claim 1, wherein the instructions further include instructions to:
   predict another zone of the second image will include an exterior light based on determining, via the first image, the identified object includes the exterior light; and
   upon determining the first difference score for the one zone is greater than the first threshold, one of update or maintain the determined first difference score for the one zone based on a distance between the one zone and the other zone.

7. The system of claim 6, wherein the instructions further include instructions to maintain the first difference score for the one zone based on a) determining a first difference score for the other zone is greater than the first threshold, or b) the distance being greater than a distance threshold.

8. The system of claim 7, wherein the instructions further include instructions to, upon determining the first difference score for the other zone is greater than the first threshold, one of update or maintain the determined first difference score for the other zone based on environment data.

9. The system of claim 6, wherein the instructions further include instructions to update the first difference score for the one zone based on a) determining a first difference score for the other zone is less than the first threshold, and b) the distance being less than a distance threshold.

10. The system of claim 6, wherein the instructions further include instructions to one of update or maintain the first difference score for the one zone based additionally on environment data.

11. The system of claim 1, wherein the instructions further include instructions to, upon determining at least one of the first difference score is greater than the first threshold or the second difference score is greater than the second threshold, operate the vehicle based additionally on at least one of non-image sensor data or map data.

12. The system of claim 1, wherein the instructions further include instructions to, upon determining, for the plurality of zones of the second image, the respective first difference scores are less than or equal to the first threshold and the respective second differences score are less than or equal to the second threshold, operate the vehicle based on the second image.

13. A method, comprising:
obtaining a first image and a second image, wherein the first image is obtained prior to the second image;
upon dividing the second image into a plurality of zones, determining respective light characteristic values for the plurality of zones based on at least one of a brightness value, a contrast value, and an intensity value for the respective zones;
determining a first difference score for one of the zones based on a difference between the light characteristic value for the one zone in the first image and a light characteristic value for a corresponding zone of the first image;
upon identifying an object in the one zone of the first image and identifying the object in the corresponding zone of the second image, determining a second difference score for the one zone based on determining a difference between respective confidence scores associated with the corresponding identified objects; and
upon determining at least one of the first difference score is greater than a first threshold or the second difference score is greater than a second threshold, operating a vehicle based on the first image.

14. The method of claim 13, further comprising, upon identifying another object in the one zone of the second image and identifying the object in the corresponding zone of the first image, determining the second difference score for the one zone based on comparing a confidence score associated with the identified object in the first image to a threshold confidence score.

15. The method of claim 13, further comprising:
predicting the one zone of the second image will include an exterior light based on determining, via the first image, the identified object includes the exterior light; and
upon determining the first difference score for the one zone is greater than the first threshold, one of updating or maintaining the determined first difference score based on environment data.

16. The method of claim 13, further comprising:
predicting another zone of the second image will include an exterior light based on determining, via the first image, the identified object includes the exterior light; and
upon determining the first difference score for the one zone is greater than the first threshold, one of updating or maintaining the determined first difference score based on a distance between the one zone and the other zone.

17. The method of claim 16, further comprising maintaining the first difference score for the one zone based on a) determining a first difference score for the other zone is greater than the first threshold, or b) the distance being greater than a distance threshold.

18. The method of claim 17, further comprising, upon determining the first difference score for the other zone is greater than the first threshold, one of updating or maintaining the determined first difference score for the other zone based on environment data.

19. The method of claim 16, further comprising updating the first difference score for the one zone based on a) determining a first difference score for the other zone is less than the first threshold, and b) the distance being less than a distance threshold.

20. The method of claim 16, further comprising one of updating or maintaining the first difference score for the one zone based additionally on environment data.

* * * * *